Aug. 11, 1936.   J. F. CARTER   2,050,647
SPEED COUPLER
Original Filed July 2, 1934
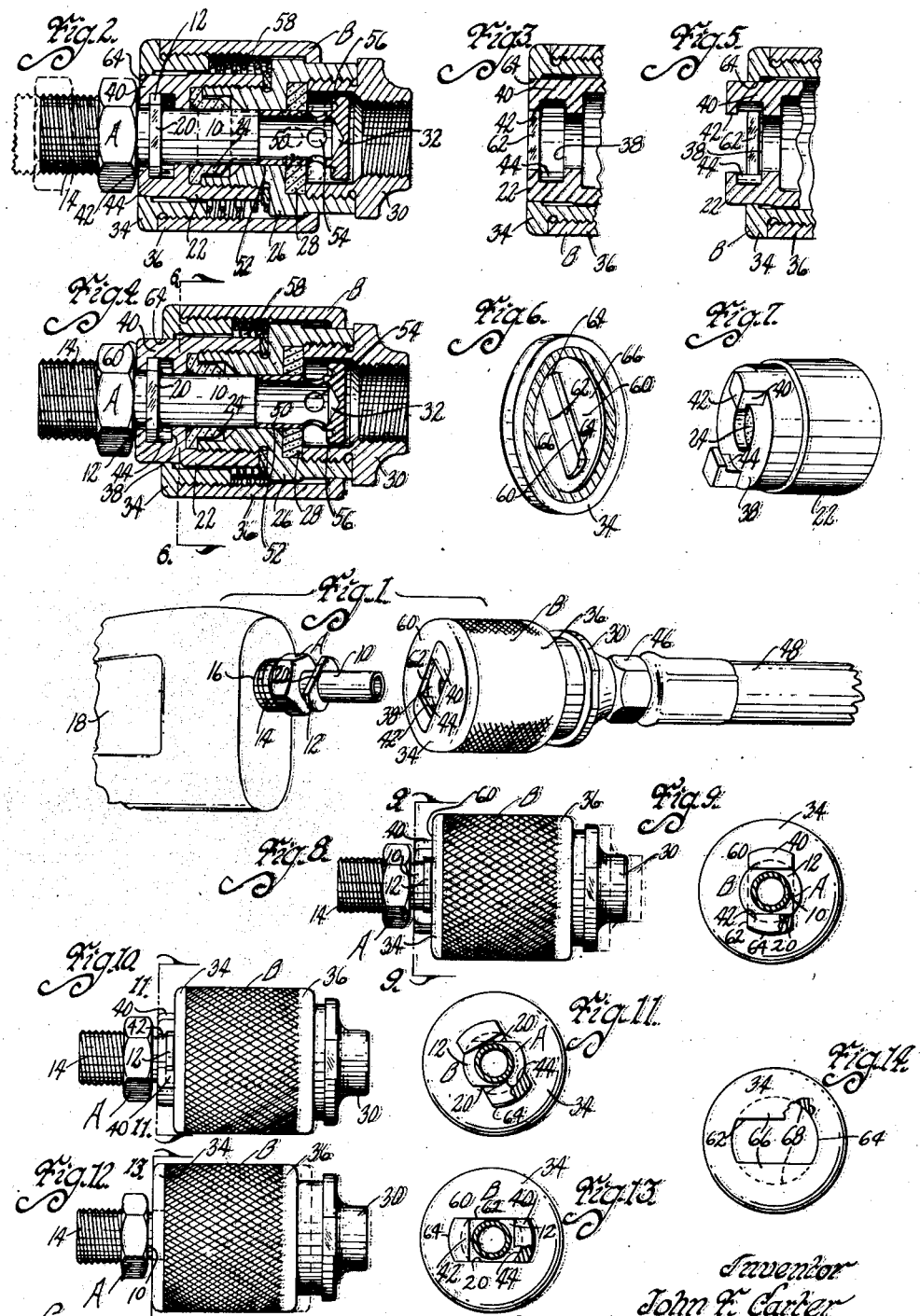

Patented Aug. 11, 1936                                         2,050,647

UNITED STATES PATENT OFFICE 2,050,647

SPEED COUPLER

John F. Carter, Bryan, Ohio, assignor to The Aro Equipment Corporation, Bryan, Ohio, a corporation of Ohio Original application July 2, 1934, Serial No. 733,448, now Patent No. 2,039,881, dated May 5, 1936. Divided and this application March 21, 1935, Serial No. 12,198

7 Claims. (Cl. 284—18)

An object of my invention is to provide a speed coupler for coupling a compressed air hose with a device to receive compressed air, the coupler being comparatively simple, durable and inexpensive to manufacture, the present application being a division of my co-pending application Serial No. 733,448, filed July 2, 1934 which has matured into Patent Number 2,039,881, dated May 5, 1936.

Still a further object is to provide a speed coupler which can be used for readily and quickly coupling an air hose by a mere telescoping and twisting action with a device to receive compressed air, the coupler likewise being uncoupleable by a telescoping and twisting action so that an air line can be quickly detached from one device and attached to another.

Another object is to include in the coupler a valve automatically operated to closed and open positions respectively by the uncoupling and coupling operations without the necessity of turning off a valve in the air supply line before transferring the coupler and turning such valve on again after transferring it.

Still a further object is to provide a coupler of different character which can freely swivel relative to the device with which it is connected and yet maintain a perfect air seal between the hose and the device, thus preventing kinking of the air hose, which, of course, is very necessary.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a perspective view of my speed coupler showing one part associated with the handle of a grease gun and the other part connected with an air supply hose.

Figure 2 is a longitudinal sectional view showing the coupler in coupled position.

Figure 3 is a sectional view similar to a portion of Figure 2, parts being omitted.

Figure 4 is a view similar to Figure 2 showing the parts in a different position, as when they are partially coupled.

Figure 5 is a view similar to a portion of Figure 4, showing parts omitted.

Figure 6 is a sectional, perspective view on the line 6—6 of Figure 4 showing only one element of the coupler.

Figure 7 is a perspective view of another element of the coupler which has a peculiar association with the one shown in Figure 6, as will be hereinafter described.

Figure 8 is a side elevation showing the first step in the coupling operation of the coupler.

Figure 9 is a sectional view on the line 9—9 of Figure 8.

Figure 10 is a side elevation similar to Figure 8 showing the second step of the coupling operation.

Figure 11 is a sectional view on the line 11—11 of Figure 10.

Figure 12 is a side elevation similar to Figure 8 showing the third step in the coupling operation.

Figure 13 is a sectional view on the line 13—13 of Figure 12; and

Figure 14 is a view similar to Figure 13, except omitting parts thereof.

My speed coupler comprises a pair of members indicated generally as A and B. The member A may be termed a nipple member and has a sleeve portion 10, a pair of opposite projections 12 and a threaded part 14 adapted for connection with a threaded reception opening, such as 16 shown in Figure 1, in the handle 18 of a grease gun.

The member A, of course, may be connected in any manner with any device to receive compressed air and about a service station there may be a considerable number of these to which air is to be supplied at various times during greasing or other operations.

The projections 12 are shown on the drawing as being formed by cutting flat spots 20 on a circular disc-like flange extending from the sleeve 10. The threaded part 14 is illustrated as a male coupling member, but can be either a female type or some other appropriate type for fluid pressure operated units or other devices with which it is to be used.

The member B comprises an inner element consisting of parts 22, 24, 26, 28, 30 and 32, and an outer element comprising parts 34 and 36.

The part 22 has an outer face from which a pair of projections 40 extend. Each projection 40 has a segment shaped flange 42, between which and the face 38 it has a dished socket 44.

The part 24 is made of leather or the like and acts as a sealing ring, it being confined between the parts 22 and 26 which are screw threaded together, as best shown in Figure 2.

The part 28 is a valve seat and it is confined in the part 26 by the part 30, these two being screw threaded together. The part 30 is screw threaded or otherwise arranged to coact with the hose fitting 46 mounted in the usual manner on the end of an air supply hose 48.

The part 32 is a valve consisting of a sleeve 50 reciprocable in a bore 52 of the part 26 and in the bore of the valve seat 28. The sleeve 50 is perforated as at 54 for the passage of fluid pressure. The valve 32 has a cupped disc-like head 56 for coaction at times with the valve seat 28.

The parts 34 and 36 are screw threadedly assembled relative to each other and are normally constrained to an extended position by a spring 58 interposed between them. The part 34 has a face 60 having therein an elongated opening provided with straight sides 62 and curved ends 64, the ends of the opening receiving the projections 40 from the face 38 of the part 22. The projections 40 always remain in the slot defined by the sides and ends 62 and 64, although they may project more or less as shown in Figures 3 and 5, Figure 3 showing the flanges 42 of the projections 40 aligned with flanges 66 of the part 34. The flanges 66 are segment shaped as shown in Figure 14, from which the member A and the part 22 and its projections 40 have been omitted. The outer edges of these flanges join the part 34 at its bore 68.

*Practical operation*

When the members A and B are disassociated they may be quickly associated with each other in an air tight manner by grasping the hose 48 or the fitting 46 and telescoping the member B over the member A. Usually, the flanges 66 will not be aligned with the flat spots 20 and so as the parts are telescoped they are also rotated, so that after the flanges 12 stop the telescoping movement by engaging across the flanges 42 and 66, alignment of the sides 62 and flanges 66 with the flat spots will soon occur as shown in Figures 8 and 9, whereupon the inner parts 22, 26 and 30 of the member B will move from the dotted position of Figure 8 and telescope further on to the member A.

As further rotation is continued, after the full line position of Figure 8 is assumed (which causes the projections 40 to assume a position with the flanges 42 thereof beyond the projections 12 of the fitting A and out of alignment with the flanges 66 as in Figure 5) the flanges 42 will assume an increased overlapping relation to the flanges 12 as shown in Figures 10 and 11, until at the completion of a quarter turn, they fully overlap the flanges 12 and, since the sides 62 of the slot in the face 60 of the outer element 22 of the member B become aligned with the flat spots 20 of the member A the spring 58, will expand, causing the element 22 to move from the dotted position of Figure 12 to the full line position. The flanges 42 will then become aligned with the flanges 66 as in Figure 3 so as to form a complete annular retaining flange for the projections 12, whereby the members A and B can be rotated relative to each other without any possibility of them becoming accidentally separated.

During the association of the member B with the member A, the sleeve 10 first passes through the sealing leather 24, shown by dotted lines in Figure 2, to prevent any leakage when the air pressure is subsequently admitted to the sealing leather by opening of the valve 32 and contracts the leather against the sleeve 10.

Opening the valve is automatically accomplished by the inner end of the sleeve 10 engaging the sleeve 50 of the valve 32 for forcing the head 56 away from the seat 28 so that air from the part 30 may pass through the ports 54 to the sleeve 10.

For disconnecting the members of the speed coupler from each other, the periphery (sleeve 36) of the member B is grasped by the operator and the coupler is rotated in either direction and at the same time pulled rearwardly so that when the sides 62 of the slot in the outer end of the element 34 align with the flat spots 20 of the flange 12 the parts 34 and 36 may be pulled rearwardly from the full line position of Figure 12 to the dotted line position thereof. Thereafter the member B may be rotated a quarter turn to first assume the position of Figures 10 and 11 and then the position of Figures 8 and 9, the member B still being pulled rearwardly.

As soon as the position of Figures 8 and 9 is assumed the member B may be pulled off the member A as the flanges 42 in this position no longer retain the flanges 12.

Thus by a simple pushing and twisting operation the supply hose 48 may be quickly coupled to a grease gun or other device while by a simple pulling and twisting motion it may be quickly uncoupled therefrom, either operation taking but a few seconds time.

During the uncoupling operation the valve 32 of the fitting B will first be seated before the sleeve 10 is pulled out of the sealing leather 24 so that the supply of air is automatically shut off without the necessity of manually closing a valve in the supply line 48.

Some changes may be made in the construction and arrangement of the parts of my device without departing from the real spirit and purpose of my invention and it is my intention to cover by my claims any modified forms of structure or use of mechanical equivalents which may be reasonably included within their scope.

I claim as my invention:

1. A speed coupler comprising a pair of fittings, one for connection to a fluid pressure operated device and the other for connection to a supply hose, one of said fittings comprising a sleeve, a plurality of projections thereon, the other of said fittings comprising an outer element and an inner element to receive said sleeve, said elements being slidable relative to each other, said elements each having flanges arranged transverse to the sliding axis and normally aligned with each other to retain said projections behind said flanges and permit swiveling of one fitting relative to the other, the flanges of one of said elements being adapted to pass said projections and assume a position out of alignment with the flanges of the other element whereupon said projections can be rotated relative to said elements to a non-retaining position relative to said flanges of the other element and said elements can then be removed from said sleeve.

2. A speed coupler comprising a pair of fittings, one comprising a sleeve and a plurality of projections thereon, the other comprising an outer element and an inner element to receive said sleeve, means within said elements and cooperating with said sleeve for sealing the elements relative to the sleeve when the sleeve is inserted in the elements, said elements being slidable relative to each other, said elements each having flanges arranged transverse to the sliding axis and normally aligned with each other to retain said projections behind said flanges and permit swiveling of one fitting relative to the other, the flanges of one of said elements being adapted to pass said projections and assume a position out of alignment with the flanges of the other element whereupon said projections can be rotated relative to said elements to a non-retaining position relative to said flanges of the other element and said elements can then be removed from said sleeve.

3. A speed coupler comprising a pair of fittings, one comprising a sleeve and a plurality of projections thereon, the other comprising an outer element and an inner element to receive said sleeve, said elements being slidable relative to each other, said elements each having flanges arranged transverse of the sliding axis and normally aligned with each other to retain said projections behind said flanges but permit rotation of said sleeve relative to said elements, the flanges of one of said elements being adapted to pass said projections and assume a position out of alignment with the flanges of the other element whereupon said projections can be rotated relative to said elements to a non-retaining position relative to said flanges of the other elements and said elements can then be removed from said sleeve and a normally closed valve in said elements openable by engagement with said sleeve when inserted therein.

4. A speed coupler comprising a pair of fittings, one of said fittings comprising a sleeve and a plurality of projections thereon, the other of said fittings comprising an outer element and an inner element to receive said sleeve, means within said elements and coacting with said sleeve for sealing the elements relative to the sleeve when the sleeve is inserted in the elements, said elements being slidable relative to each other, said elements arranged laterally relative to the sliding axis and each having flanges normally aligned with each other to retain said projections and permit relative rotation of said fittings, the flanges of one of said elements being adapted to pass said projections and assume a position out of alignment with the flanges of the other element whereupon said projections can be rotated relative to said elements to a non-retaining position relative to said flanges of the other element and said elements can then be removed from said sleeve and a normally closed valve in said elements openable by engagement with said sleeve when inserted therein.

5. A speed coupler for a fluid pressure line comprising a pair of tubular fittings, one of said fittings having a projection and the other of said fittings comprising a pair of elements movable relative to each other, said pair of elements having normally aligned flanges arranged transversely to the axis of said tubular fittings and which retain said projection behind them yet permit rotation thereof relative to said other fitting, said flanges being positionable out of alignment to successively pass by said projection for disconnection purposes.

6. A speed coupler comprising a sleeve having a pair of opposite lateral projections, a pair of tubular elements, one mounted telescopically within the other, said elements being adapted to receive said sleeve and its projections, one of said elements having a slot-like opening through which said sleeve and its projections may pass when the projections are aligned with the slot, the sides of said slot retaining said projections against removal of said sleeve when said projections are thereafter rotated to non-aligned position with relation to said slot, the other of said elements having a pair of hook-like flanges normally positioned in said slot and in alignment with said slot sides to provide in conjunction therewith a complete annular flange to retain said projections yet permit rotation of said sleeve relative to said elements, said hook-like flanges being projectible to a position permitting said projections of said sleeve to be rotated to a position inside said flanges and thereby to aligned position with relation to said slot when the projections are rotated against the outer face of said first element.

7. A speed coupler comprising a sleeve having a pair of opposite lateral projections, a pair of tubular elements, one mounted telescopically within the other, said elements being adapted to receive said sleeve and its projections, one of said elements having a slot-like opening through which said sleeve and its projections may pass when the projections are aligned with the slot, the sides of said slot retaining said projections against removal of said sleeve when said projections are thereafter rotated to non-aligned position with relation to said slot, the other of said elements having a pair of hook-like flanges normally positioned in said slot and in alignment with said slot sides to provide in conjunction therewith, a complete annular flange to retain said projections yet permit rotation of said sleeve relative to said elements, spring means interposed between said elements to bias them relative to each other to said normal position, said hook-like flanges being projectible to a position permitting said projections of said sleeve to be rotated to a position inside said flanges and thereby to aligned position with relation to said slot when the projections are rotated against the outer face of said first element.

JOHN F. CARTER.